(12) United States Patent
Gaines

(10) Patent No.: US 6,276,962 B1
(45) Date of Patent: Aug. 21, 2001

(54) WALL FACEPLATE SYSTEM

(76) Inventor: Raymond T. Gaines, 1015 Victor Herbert Dr., Largo, FL (US) 33771

( * ) Notice: Subject to any disclaimer, the term of this patent is extended or adjusted under 35 U.S.C. 154(b) by 0 days.

(21) Appl. No.: 09/675,393

(22) Filed: Sep. 29, 2000

(51) Int. Cl.$^7$ .................................................. H01R 13/60
(52) U.S. Cl. ............................................. 439/536; 174/66
(58) Field of Search ............................... 439/536; 174/66

(56) References Cited

U.S. PATENT DOCUMENTS 3,619,477 * 11/1971 Rasmussen ............................. 174/66
5,318,453 * 6/1994 Hwang ................................. 439/536
6,103,974 * 8/2000 Erdfarb ................................. 174/66

* cited by examiner

Primary Examiner—Brian Sircus
Assistant Examiner—Phuong Dinh

(57) ABSTRACT

A wall faceplate system comprises a plate of a rigid material with a top, a bottom and two side edges there between and an exposed front surface and an unexposed back surface. Edges around the periphery curve toward the back unexposed surface of the plate. The plate has three apertures which include two attachment apertures and one central aperture. The apertures are located on the vertical midline of the plate. The plate includes an indented area on the back unexposed surface of the plate being formed by the curved edges and the back surface. In addition there is a rectilinear diaphragm of elastomeric-like material, with the diaphragm having a hole. There is a means coupling the diaphragm to the back surface of the plate with the hole in the diaphragm axially centered in the central aperture of the plate for the passage and support of coaxial cable.

4 Claims, 3 Drawing Sheets

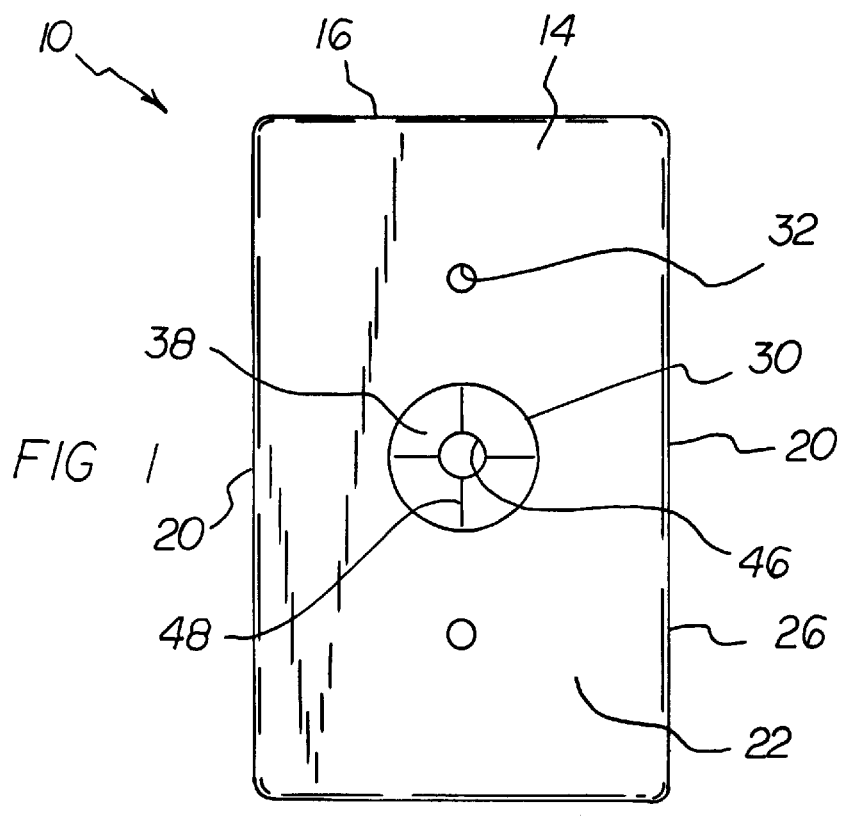
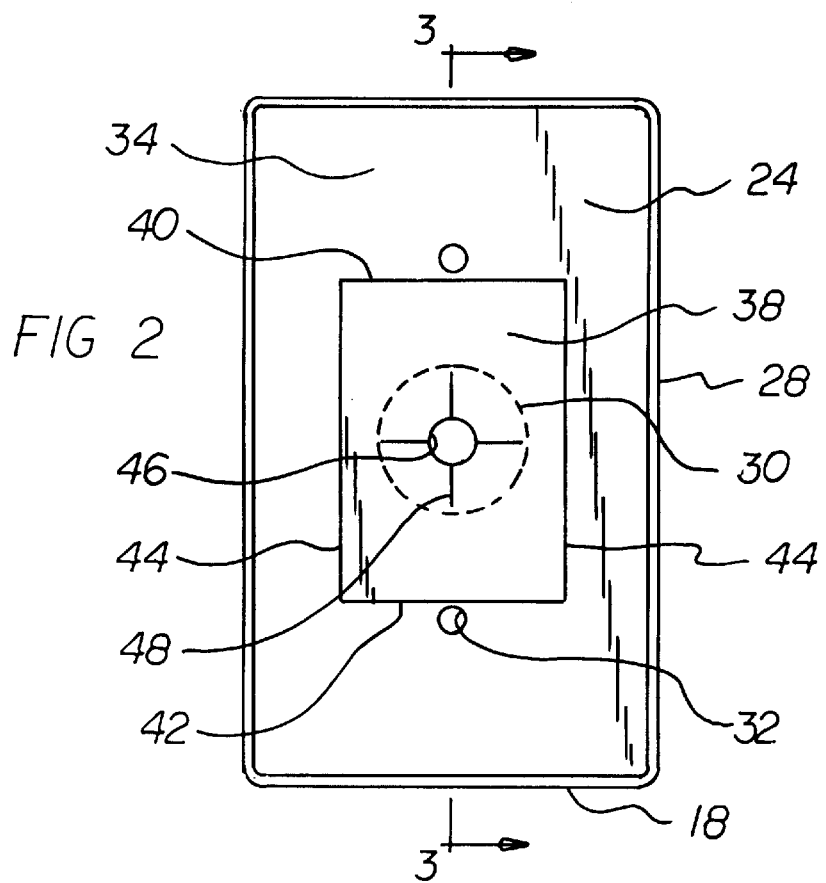

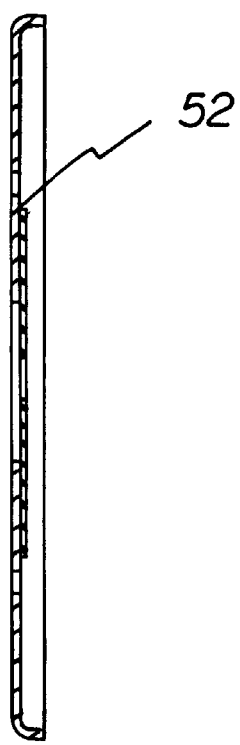
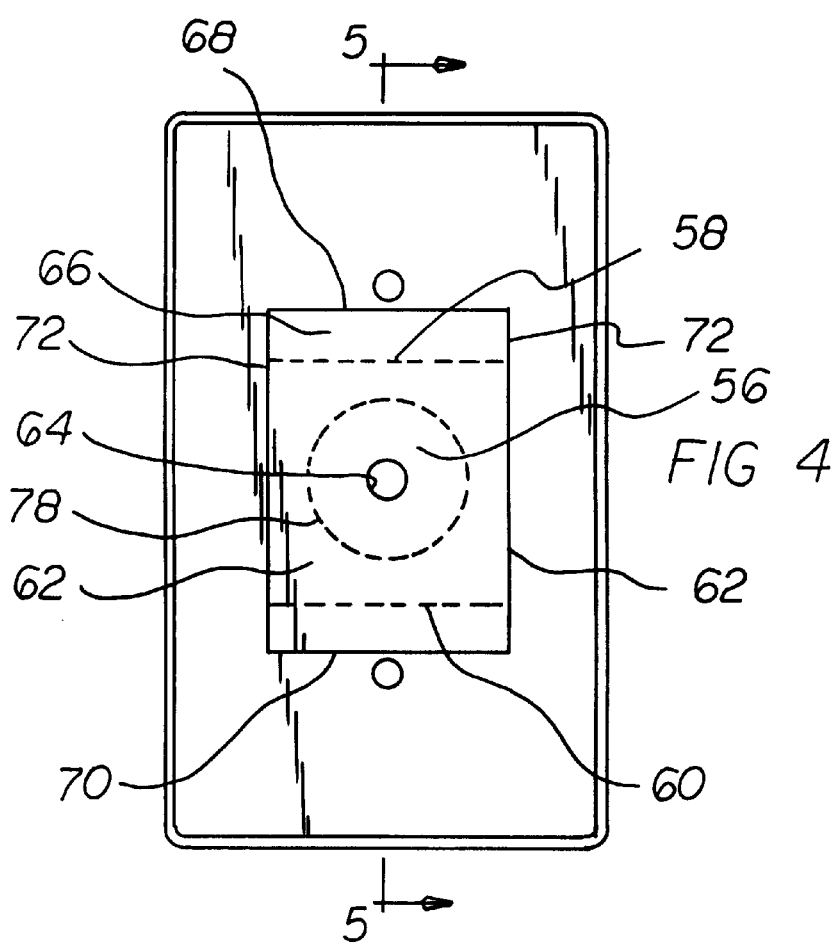

WALL FACEPLATE SYSTEM

BACKGROUND OF THE INVENTION

1. Field of the Invention

The present invention relates to a wall faceplate system and more particularly pertains to permitting the passage and support of a coaxial cable of any of a plurality of diameters.

2. Description of the Prior Art

The use of faceplates of known designs and configurations is known in the prior art. More specifically, wall faceplates previously devised and utilized for the purpose of allowing the passage of coaxial cable are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,114,365 to Thompson, issued May 19, 1992, discloses a mounting for a modular jack in conjunction with a standard wall power outlet. U.S. Pat. No. 5,823,811 to Blanchfield et al issued Oct. 20, 1998, discloses a sealed electric connector. Lastly, U.S. Pat. No. 4,850,895 to Aria et al issued Jul. 25, 1989, discloses a coaxial cable connection assembly with a transceiver.

While these devices fulfill their respective, particular objectives and requirements, the aforementioned patents do not describe a wall faceplate system that allows the passage and supports a coaxial cable of any of a plurality of diameters.

In this respect, the wall faceplate system according to the present invention substantially departs from the conventional concepts and designs of the prior art, and in doing so provides an apparatus primarily developed for the purpose of permitting the passage and supporting a coaxial cable of any of a plurality of diameters.

Therefore, it can be appreciated that there exists a continuing need for a new and improved wall faceplate system which can be used for permitting the passage and supporting a coaxial cable of any of a plurality of diameters. In this regard, the present invention substantially fulfills this need.

SUMMARY OF THE INVENTION

In view of the foregoing disadvantages inherent in the known types of wall faceplate of known designs and configurations now present in the prior art, the present invention provides an improved wall faceplate system. As such, the general purpose of the present invention, which will be described subsequently in greater detail, is to provide a new and improved wall faceplate system and method which has all the advantages of the prior art and none of the disadvantages.

To attain this, the present invention essentially comprises a wall faceplate system for permitting the passage and support of a coaxial cable of any of a plurality of diameters. The faceplate system comprises, in combination, a faceplate, being a generally rectilinear flattened plate of a rigid material, preferably a plastic. The faceplate has a top edge and a bottom edge and two side edges there between. It has an exposed front surface and an unexposed back surface. The plate has a width of between about 2.5 and 3.0 inches and a length of between about 4.5 and 5.0 inches. It has a thickness of between about 0.20 and 0.30 of an inch. The plate is bent about the edges and has curved edges around the periphery which curve toward the back unexposed surface of the plate. The curving of the edge forms a peripheral edge in a plane parallel with the general plane of the front surface and the back surface of the plate. The plate has three apertures, a large central aperture and two adjacent apertures, all of which are located on the vertical midline of the plate. The central aperture is between about 0.75 and 1.25 inch in diameter, the outermost apertures, which are the attachment apertures, are each between about 0.5 and 1.0 inch from the upper and lower edges and between about 0.20 and 0.25 of an inch in diameter. The faceplate includes an indented area on the back unexposed surface of the plate being formed by the curved edges and the back surface. The indented area is between about 0.10 and 0.20 of an inch in depth and between about 2.0 and 2.5 inches in height and between about 1.5 and 2.0 inches in width. There is also included in the system a rectilinear diaphragm of elastomeric-like material, preferably a plastic, having an upper edge and a lower edge and side edges therein between. The diaphragm has a thickness of between about 20 and 30 thousandths of an inch and a height of between about 2.0 and 2.75 inches and a width of between about 1.25 and 2.0 inches. The diaphragm has a hole with a diameter of between about 0.25 and 0.30 of an inch located on the centerline of each axis of the elastomeric diaphragm. In addition there are four radius slits of between about 0.2 and 0.3 of an inch in length running toward the outside edge of the diaphragm at right angles to each other. Also included in the system is an adhesive coupling which connects and adheres the diaphragm to the back surface of the plate. The hole in the diaphragm is axially centered in the central aperture of the plate. There are screws through the attachment apertures of the plate for coupling the plate to the wall with the front surface exposed. A length of coaxial cable of a reduced diameter of between about 0.20 and 0.35 of an inch may be passed through the hole and supported thereby. A length of coaxial cable of an enlarged diameter of up to 1.0 inch may also be passed through the hole and supported thereby. Another alternate embodiment of the wall faceplate system is the use of a rubber diaphragm which is comprised of a distensible rubber material, preferably a natural rubber, synthetic rubber, or a blend thereof. The diaphragm has a upper edge a lower edge and side edges therein between. The diaphragm has a thickness of between about 20 and 30 thousandths of an inch and a height of between about 1.25 and 1.75 inches and a width of between about 1.25 and 1.75 inches. The rubber diaphragm has a hole with a diameter of between about 0.25 and 0.30 of an inch located on the centerline of each axis of the rubber diaphragm. This configuration further includes a back up plate comprised of a rigid material, preferably plastic, having a thickness of between about 20 and 30 thousandths of an inch. The back up plate has an upper edge, a lower edge and side edges therein between. The back up plate has an exposed face and an unexposed face with an aperture located centrally on the axises of the exposed face of the back up plate. The central aperture of the back up plate is between about 0.75 and 1.25 inches in diameter. The back up plate has a width of between about 1.3 and 1.7 inches and a height of between about 2.0 and 2.5 inches. The aperture of the back up plate is axially centered in the central aperture of the wall plate. Screws may be placed through the attachment apertures of the faceplate for coupling the plate to the wall with the front surface exposed. A length of coaxial cable of a reduced diameter of between about 0.20 and 0.35 of an inch may be passed through the hole and supported thereby. Additionally, a length of coaxial cable of an enlarged diameter of up to 1.0 inch may also be passed through the hole and supported thereby. Lastly, the system is further provided to also include a coupling means, preferably a rubber cement, for adhering the backup plate, rubber diaphragm and faceplate together.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved a wall faceplate system which has all of the advantages of the prior art of existing wall faceplates of known designs and configurations and none of the disadvantages.

It is another object of the present invention to provide a new and improved wall faceplate system which may be easily and efficiently manufactured and marketed.

It is further object of the present invention to provide a new and improved wall faceplate system which is of durable and reliable construction.

An even further object of the present invention is to provide a new and improved wall faceplate system which is susceptible of a low cost of manufacture with regard to both materials and labor, and which accordingly is then susceptible of low prices of sale to the consuming public, thereby making such wall faceplate system economically available to the buying public.

Even still another object of the present invention is to provide a wall faceplate system for permitting the passage and supporting a coaxial cable of any of a plurality of diameters.

Lastly, it is an object of the present invention to provide a new and improved wall faceplate system comprising a wall faceplate system comprising a plate of a rigid material. The plate has a top edge and a bottom edge and two side edges there between and with an exposed front surface and an unexposed back surface. The wall faceplate has curved edges around the periphery curving toward the back unexposed surface of the plate. The plate has three apertures which include two attachment apertures and one central aperture. The apertures are located on the vertical midline of the plate. The plate includes an indented area on the back unexposed surface of the plate being formed by the curved edges and the back surface. In addition there is a rectilinear diaphragm of elastomeric-like material, with the diaphragm having a hole. Lastly there is a means coupling the diaphragm to the back surface of the plate with the hole in the diaphragm axially centered in the central aperture of the plate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of the wall faceplate system, constructed in accordance with the principles of the present invention.

FIG. 2 is a back elevational view of the wall faceplate system shown in FIG. 1.

FIG. 3 is side elevational view, taken along line 3—3 of FIG. 2.

FIG. 4 is a back elevational view of the wall faceplate configuration having a distensible diaphragm, constructed in accordance with an alternate embodiment of the invention.

The same reference numerals refer to the same parts throughout the various Figures.

DESCRIPTION OF THE PREFERRED EMBODIMENT

Figure 5:
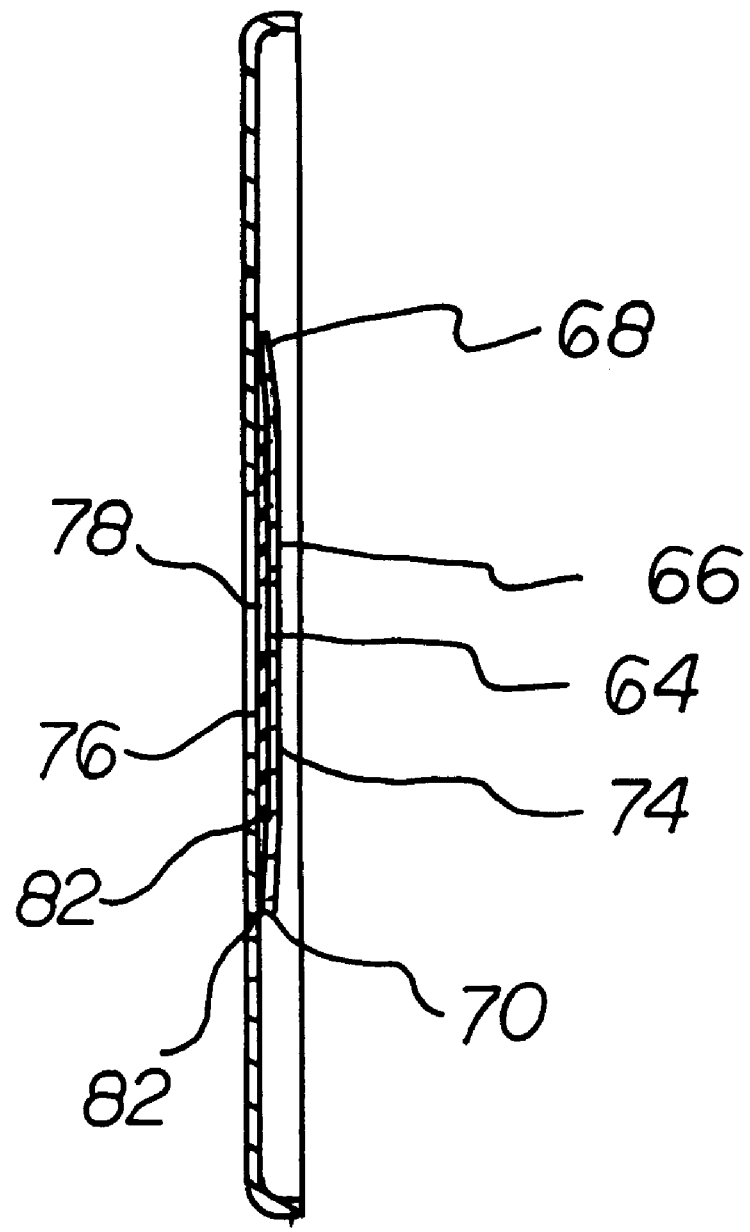
FIG. 5 is a side elevational view, taken along line 5—5 of FIG. 4.

With reference now to the drawings, and in particular to FIG. 1 thereof, the preferred embodiment of the new and improved wall faceplate system embodying the principles and concepts of the present invention and generally designated by the reference numeral 10 will be described.

The present invention, the wall faceplate system 10 is comprised of a plurality of components. Such components in their broadest context include a wall faceplate, a diaphragm comprised of an elastomer, and coupling means. Such components are individually configured and correlated with respect to each other so as to attain the desired objective.

The wall faceplate system 10 functions for permitting the passage and support of a coaxial cable. The cable may be of a plurality of diameters. The faceplate system comprises, in combination, a faceplate 14. Such faceplate is in a generally rectilinear flattened configuration. It is fabricated of a rigid material, preferably a plastic. It may be, however, made of a metal as well.

The faceplate is rectilinear. It has a top edge 16 and a bottom edge 18 and two side edges 20 there between. It has an exposed front surface 22 and an unexposed back surface 24. The plate has a width of between about 2.5 and 3.0 inches and a length of between about 4.5 and 5.0 inches. It has a thickness of between about 0.20 and 0.30 of an inch.

The plate is bent about the edges and has curved edges 26 around the periphery. The peripheral edges curve toward the back unexposed surface of the plate. The curving of the edge forms a peripheral edge 28 in a plane parallel with the general plane of the front surface and the back surface of the plate.

The plate has three apertures 30 32. The apertures include a large central aperture 30 and two adjacent apertures 32. All of the apertures are located on the vertical midline of the plate. The central aperture 30 is between about 0.75 and 1.25 inch in diameter. The outermost apertures 32, which are the attachment apertures, are each between about 0.5 and 1.0 inch from the upper and lower edges and between about 0.20 and 0.25 of an inch in diameter.

The faceplate includes a generally rectilinear indented area 34 on the back unexposed surface of the plate. Such indented area is formed by the curved edges and the back surface. The indented area is between about 0.10 and 0.20 of an inch in depth and between about 2.0 and 2.5 inches in height and between about 1.5 and 2.0 inches in width.

There is also included in the system a rectilinear diaphragm 38. The diaphragm is fabricated of elastomeric-like material, preferably a plastic. It is formed in a rectangle and has an upper edge 40 and a lower edge 42 and side edges 44 therein between. The diaphragm has a thickness of between about 20 and 30 thousandths of an inch and a height of between about 2.0 and 2.75 inches and a width of between about 1.25 and 2.0 inches. The diaphragm has a hole 46 with a diameter of between about 0.25 and 0.30 of an inch located on the centerline of each axis of the elastomeric diaphragm. In addition there are four radius slits 48. The slits are between about 0.2 and 0.3 of an inch in length running toward the outside edge of the diaphragm at right angles to each other.

Also provided and included in the system is an adhesive 52 coupling which connects and adheres the diaphragm to the back surface of the plate. The adhesive extends entirely around the hole of the diaphragm and the central aperture of the plate.

The hole in the diaphragm is axially centered in the central aperture of the plate. There are screws through the attachment apertures of the plate for coupling the plate to the wall with the front surface exposed. A length of coaxial cable of a reduced diameter of between about 0.20 and 0.35 of an inch may be passed through the hole and supported thereby. A length of coaxial cable of an enlarged diameter of up to 1.0 inch may also be passed through the hole and supported thereby.

An alternate embodiment of the invention is shown in FIGS. 4 and 5. In such embodiment the wall faceplate system employs a rubber diaphragm 56 which is comprised of a distensible rubber material, preferably a natural rubber, synthetic rubber, or a blend thereof. The diaphragm 56 is rectilinear. The diaphragm has an upper edge 58 and a lower edge 60 and side edges 62 therein between. The diaphragm has a thickness of between about 20 and 30 thousandths of an inch. The diaphragm has a height of between about 1.25 and 1.75 inches and a width of between about 1.25 and 1.75 inches. The rubber diaphragm has a hole 64 with a diameter of between about 0.25 and 0.30 of an inch located on the centerline of each axis of the rubber diaphragm.

This configuration further includes a back up plate 66 comprised of a rigid material, preferably plastic, having a thickness of between about 20 and 30 thousandths of an inch. The back up plate has an upper edge 68, a lower edge 70 and side edges 72 therein between. The back up plate has an exposed face 74 and an unexposed face 76. An aperture 78 is located centrally on the axises of the exposed face of the back up plate. The central aperture of the back up plate is between about 0.75 and 1.25 inches in diameter. The back up plate has a width of between about 1.3 and 1.7 inches and a height of between about 2.0 and 2.5 inches.

The aperture of the back up plate is axially centered in the central aperture of the wall plate. Screws may be placed through the attachment apertures of the faceplate for coupling the plate to the wall with the front surface exposed. A length of coaxial cable of a reduced diameter of between about 0.20 and 0.35 of an inch may be passed through the hole and supported thereby. Additionally, a length of coaxial cable of an enlarged diameter of up to 1.0 inch may also be passed through the hole and supported thereby.

Lastly, the system is further provided to also include a coupling means, preferably a rubber cement 82, for adhering the backup plate, rubber diaphragm and faceplate together. The coupling means is applied to the backup plate, the diaphragm and the faceplate to bond between all three of these elements together and to prevent movement of the diaphragm when it is in place.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the united states is as follows:

1. A wall faceplate for permitting the passage and support of a coaxial cable of any of a plurality of diameters comprising, in combination;

a generally rectilinear flattened plate of a rigid material, preferably a plastic, having a top edge and a bottom edge and two side edges there between and with an exposed front surface and an unexposed back surface, the plate having a width of between about 2.5 and 3.0 inches and a length of between about 4.5 and 5.0 inches and a thickness of between about 0.20 and 0.30 of an inch and having curved edges around the periphery curving toward the back unexposed surface of the plate forming a peripheral edge in a plane parallel with the general plane of the front surface and the back surface of the plate, the plate having three apertures, all three apertures located on the vertical midline of the plate, with the central aperture being between about 0.75 and 1.25 inch in diameter, the outermost apertures which are the attachment apertures each being between about 0.5 and 1.0 inch from the upper and lower edges and between about 0.20 and 0.25 of an inch in diameter, the plate including an indented area on the back unexposed surface of the plate being formed by the curved edges and the back surface being between about 0.10 and 0.20 of an inch in depth and between about 2.0 and 2.5 inches in height and between about 1.5 and 2.0 inches in width;

a rectilinear diaphragm of elastomeric-like material, preferably a plastic, having an upper edge and a lower edge and side edges therein between with a thickness of between about 20 and 30 thousandths of an inch and a height of between about 2.0 and 2.75 inches and a width of between about 1.25 and 2.0 inches, the diaphragm having a hole with a diameter of between about 0.25 and 0.30 of an inch located on the centerline of each axis of the elastomeric diaphragm with four radius slits of between about 0.2 and 0.3 of an inch in length running toward the outside edge of the diaphragm at right angles to each other; and an adhesive coupling the diaphragm to the back surface of the plate with the hole in the diaphragm axially centered in the central aperture of the plate and with screws through the attachment apertures of the plate for coupling the plate to the wall with the front surface exposed whereby a length of coaxial cable of a reduced diameter of between about 0.20 and 0.35 of an inch may be passed through the hole and supported thereby as well as a length of coaxial cable of an enlarged diameter of up to 1.0 inch may also be passed through the hole and supported thereby.

2. A wall faceplate system comprising;

a plate of a rigid material having a top edge and a bottom edge and two side edges there between and with an exposed front surface and an unexposed back surface and having curved edges around the periphery curving toward the back unexposed surface of the plate, the plate having apertures, including attachment apertures and a central aperture located on the vertical midline of the plate, the plate including an indented area on the back unexposed surface of the plate being formed by the curved edges and the back surface;

a rectilinear diaphragm comprised of a flexible elastomer, having an upper edge and a lower edge and side edges therein between with a thickness of between about 20 and 30 thousandths of an inch and a height of between about 2.0 and 2.75 inches and a width of between about 1.25 and 2.0 inches, the diaphragm having a hole with a diameter of between about 0.25 and 0.30 of an inch located on the centerline of each axis of the flexible plastic diaphragm with four radius slits of between about 0.2 and 0.3 of an inch in length running toward the outside edge of the diaphragm at right angles to each other; and an adhesive coupling the diaphragm to the back surface of the plate with the hole in the diaphragm axially centered in the central aperture of the plate for the passage and support of coaxial cable and with screws through the attachment apertures of the plate for coupling the plate to the wall with the front surface exposed whereby a length of coaxial cable of a reduced diameter of between about 0.20 and 0.35 of an inch may be passed through the hole and supported thereby as well as a length of coaxial cable of an enlarged diameter of up to 1.0 inch may also be passed through the hole and supported thereby.

3. A wall faceplate system comprising:

a plate of a rigid material having a top edge and a bottom edge and two side edges there between and with an exposed front surface and an unexposed back surface and having curved edges around the periphery curving toward the back unexposed surface of the plate, the plate having apertures, including attachment apertures and a central aperture located on the vertical midline of the plate, the plate including an indented area on the back unexposed surface of the plate being formed by the curved edges and the back surface;

a rectilinear diaphragm comprised of a distensible elastomeric material having a hole with a diameter of between about 0.25 and 0.30 of an inch;

a back up plate, comprised of a rigid material with an aperture;

means coupling the diaphragm to the back surface of the plate with the hole in the diaphragm axially centered in the central apertures of the plate for the passage and support of coaxial cable; and a supplemental coupling means for adhering the backup plate, elastomeric diaphragm and back up plate together with the supplemental coupling means being applied to and contacting the back up plate, the diaphragm and the unexposed surface of the wall faceplate.

4. A wall faceplate system comprising;

a plate of a rigid material having a top edge and a bottom edge and two side edges there between and with an exposed front surf ac e and an unexposed back surface and having curved edges around the periphery curving toward the back unexposed surface of the plate, the plate having apertures, including attachment apertures and a central aperture located on the vertical midline of the plate, the plate including an indented area on the back unexposed surface of the plate being formed by the curved edges and the back surface;

a rectilinear diaphragm comprised of a distensible elastomeric material, the diaphragm having an upper edge and a lower edge and side edges therein between with a thickness of between about 20 and 30 thousandths of an inch and a height of between about 1.25 and 1.75 inches and a width of between about 1.25 and 1.75 inches, the diaphragm having a hole with a diameter of between about 0.25 and 0.30 of an inch located on the centerline of each axis of the rubber diaphragm;

a back up plate, comprised of a rigid plastic material having a thickness of between about 20 and 30 thousandths of an inch with an upper edge and a lower edge and side edges therein between and having an exposed face and an unexposed face with an aperture located centrally on the axes of the exposed face of the back up plate, the aperture being between about 0.75 and 1.25 inches in diameter, the back up plate having a width of between about 1.3 and 1.7 inches and a height of between about 2.0 and 2.5 inches with the aperture in the back up plate axially centered in the central aperture of the wall plate and with screws through the attachment apertures of the plate for coupling the plate to the wall with the front surface exposed whereby a length of coaxial cable of a reduced diameter of between about 0.20 and 0.35 of an inch may be passed through the hole and supported thereby as well as a length of coaxial cable of an enlarged diameter of up to 1.0 inch may also be passed through the hole and supported thereby; and means coupling the diaphragm to the back surface of the plate with the hole in the diaphragm axially centered in the central aperture of the plate for the passage and support of coaxial cable.

* * * * *